United States Patent Office 3,303,021
Patented Feb. 7, 1967

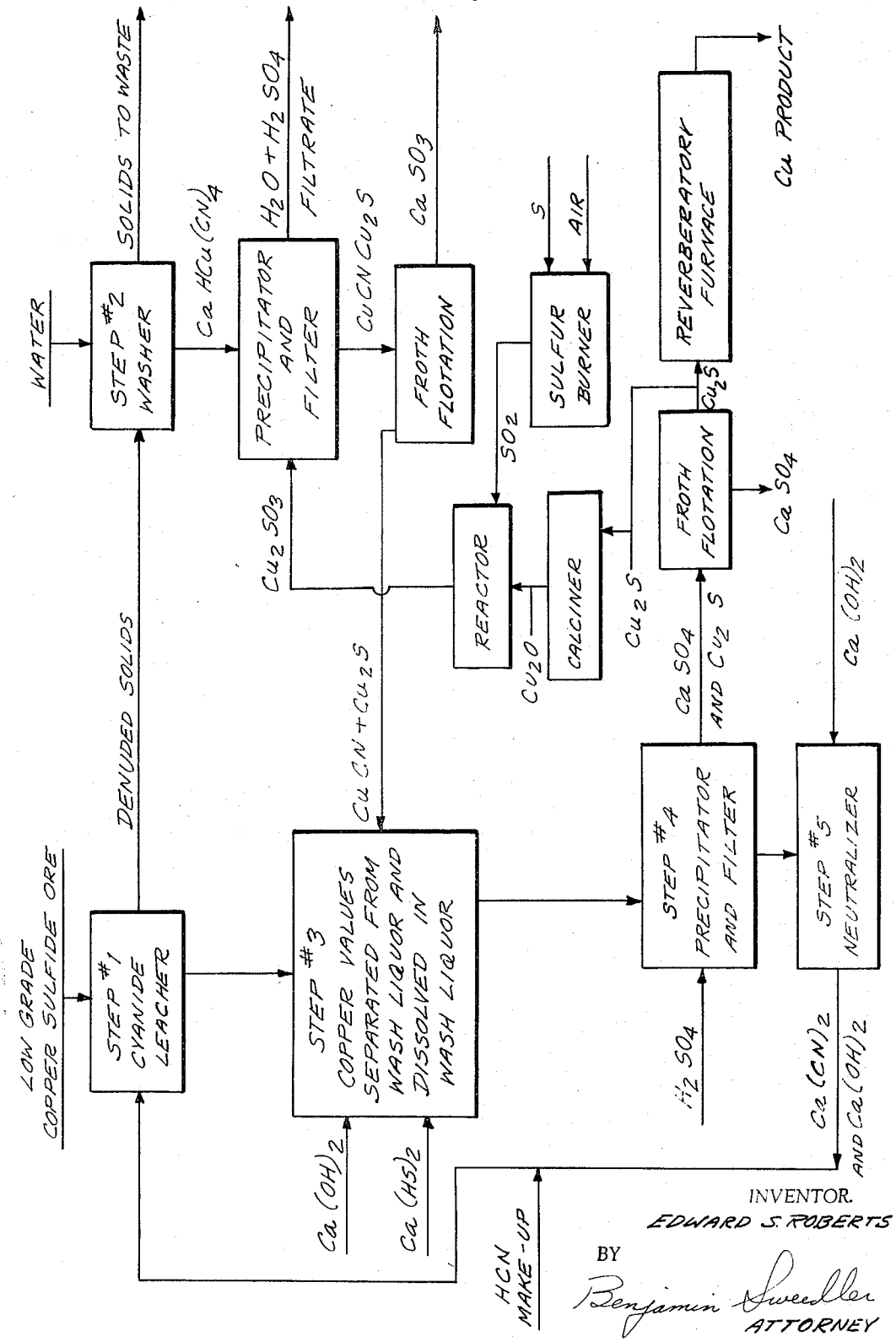

3,303,021
RECOVERY OF COPPER FROM LOW-GRADE
COPPER SULFIDE ORES
Edward S. Roberts, Ridgewood, N.Y., assignor to Treadwell Corporation, New York, N.Y., a corporation of New York
Filed May 8, 1964, Ser. No. 365,884
9 Claims. (Cl. 75—105)

This invention relates to the recovery of copper from low-grade copper sulfide ores. Such ores include tailings, overburden and other such materials heretofore sent to waste chiefly because the copper therein was of such low concentration or of such fine particle size or so disseminated in the gangue that it was not economically feasible to recover the copper because recovery of the copper by known techniques could not be justified, i.e., the expense of recovery would exceed the economic value of the copper obtained.

This invention is applicable to the treatment of all low-grade copper sulfide ores in an alkaline gangue where the copper minerals occur in such low concentration or are of such fine particle size or are so disseminated in the gangue that the copper minerals cannot be economically separated from the gangue by froth flotation and where the gangue is of such an acid-consumable nature that it cannot be economically acid leached.

Exemplary of copper-containing ores which can be treated are tailings obtained from the treatment of copper ores consisting of a mixture of chalcocite ($Cu_2S$) and covellite (CuS); the gangue is mainly calcite ($CaCO_3$). The ores contain approximately 0.5% copper. After grinding and froth flotation the tailings thus obtained contain approximately 0.2% copper. The copper in the tailings cannot be economically separated by froth flotation chiefly because of its fine particle size, with the particles widely disseminated or scattered in the gangue. Acid leaching of such tailings is uneconomic because the large amount of acid required to recover the small amount of copper from the gangue renders acid leaching techniques prohibitively expensive.

The present process is applicable to treatment of all low-grade copper sulfide ores containing from 0.2% to 0.8% copper. All references herein to percentage values of copper refer to copper metal and not copper compounds.

In this specification, all percentages are given on a weight basis; the expression "alkaline cyanide leaching medium" means the medium employed to treat the ore to recover the copper values; the expression "leach liquor" means the liquor separated from the ore after trantment with the alkaline cyanide leaching medium, which liquor contains dissolved copper values chiefly in the form of a copper complex; and the expression "wash liquor" means the liquor obtained by washing with water the extracted or denuded solids separated from the leach liquor to recover adherent copper and cyanide values which are present in or on the denuded solids.

The recovery of copper from ore by alkaline cyaniding of the ore to dissolve the copper in the alkaline cyanide leaching medium is known. The application of such techniques to recover the copper from low-grade copper sulfide ore, to be economically attractive, necessitates recovering the copper and cyanide values adhering to the denuded solids separated from the leach liquor, because unless the cynanide adhering to the denuded solids is recovered for re-use, the economics of the process becomes unattractive. Washing the denuded solids to remove soluble copper cyanide complex results in a dilute solution. Addition of this solution to the leach liquor containing dissolved copper values results in the production of such large volumes of liquor requiring treatment for recovery of the copper values as to render the cost of handling such large volumes prohibitive.

Acidification of the wash liquor with sulfuric acid to precipitate the copper as cuprous cyanide and produce a dilute solution of HCN results in the production of such a dilute HCN solution that recovery of HCN therefrom, as a practical matter, is not economically attractive. This is because of the large and costly equipment required for recovery of the HCN by stripping with an inert gas such as nitrogen and recovering the HCN from the inert gas stream, for example, by contact with a calcium hydroxide solution or by other known technique for recovering the HCN from such dilute solution.

It is a principal object of this invention to provide an economically attractive process for recovering copper from low-grade sulfide copper ores.

It is another object of this invention to provide such process which minimizes reagent losses in the moisture clinging to the barren or denuded solids discarded, and this without at the same time excessively diluting the leach liquor with the wash liquor.

Other objects and advantages of this invention will be apparent from the following detailed description thereof.

In accordance with this invention low-grade copper sulfide ores are treated as follows:

Step 1, the ore is treated with an alkaline cyanide leaching medium to produce a leach liquor containing soluble copper complex, which leach liquor is separated from the denuded solids;

Step 2, the denuded solids are washed with water to remove the copper and cyanide values adhering to the denuded solids produced in Step 1 by dissolving the same in the wash liquor;

Step 3, these copper and cyanide values are isolated from the wash liquor and dissolved in the leach liquor without excessively diluting the leach liquor;

Step 4, the solution from Step 3 is treated with sulfuric acid to precipitate cuprous sulfide and alkali metal or alkaline earth metal sulfate. This cuprous sulfide is separated from the metal sulfate and the separated cuprous sulfide can be converted by any conventional technique to pure copper; and Step 5, the liquid from Step 4 containing hydrogen cyanide and sulfuric acid is neutralized to produce the alkaline cyanide leaching medium employed in Step 1; make-up HCN can be added to the stream of alkaline cyanide leaching medium flowing from Step 5 to Step 1.

In accordance with a preferred embodiment of this invention, low-grade copper sulfide ores are treated with a calcium cyanide leaching medium. The latter contains calcium hydroxide and hydrogen cyanide as well as calcium cyanide formed by reaction of the calcium hydroxide with the hydrogen cyanide. The steps of the preferred process are as follows:

Step 1, the ore is leached with the calcium cyanide leaching medium to produce a leach liquor containing soluble calcium copper complex and calcium sulfhydrate $(Ca(HS)_2)$. The resultant leach liquor is separated from the denuded solids. The reactions which take place in this step are as follows:

$2Cu_2S + 5Ca(OH)_2 + 16HCN$
$= 5CaHCu(CN)_4 + Ca(HS)_2 + 10H_2O$
$2Cu_2S + 5Ca(CN)_2 + 6HCN = 4CaHCu(CN)_4 + Ca(HS)_2$
$2Cu_2S + 8Ca(CN)_2 + 6H_2O$
$= 4CaHCu(CN)_4 + Ca(HS)_2 + 3Ca(OH)_2$
$2HCN + Ca(OH)_2 = Ca(CN)_2 + 2H_2O$

Step 2, the denuded solids are washed with water to produce the wash liquor containing copper and cyanide values removed from the denuded solids. The copper and cyanide values are recovered by reacting the wash liquor with cuprous sulfite or cuprous sulfate and sulfur dioxide to precipitate cuprous cyanide and cuprous sulfide. The reactions which take place are as follows:

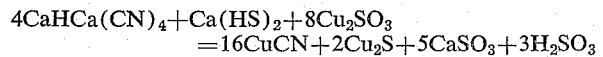
$$4CaHCa(CN)_4 + Ca(HS)_2 + 8Cu_2SO_3$$
$$= 16CuCN + 2Cu_2S + 5CaSO_3 + 3H_2SO_3$$
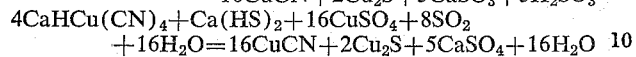
$$4CaHCu(CN)_4 + Ca(HS)_2 + 16CuSO_4 + 8SO_2$$
$$+ 16H_2O = 16CuCN + 2Cu_2S + 5CaSO_4 + 16H_2O$$

The cuprous sulfite employed in effecting precipitation of the copper and cyanide values from the wash liquor can be prepared by calcining some of the cuprous sulfite produced in the process to form cuprous oxide ($Cu_2O$) and combining the cuprous oxide with sulfur dioxide to form cuprous sulfite in accordance with the equation:

$$Cu_2O + SO_2 = Cu_2SO_3$$

Alternatively, the wash liquor can be treated directly with cuprous oxide and sulfur dioxide or with cuprous sulfate and sulfur dioxide to react with the calcium copper cyanide complex to precipitate cuprous cyanide and cuprous sulfide.

Step 3, the precipitate formed in Step 2 is separated from the liquid and introduced into the leach liquor where it is dissolved. The dissolution of the cuprous cyanide and cuprous sulfide in the leach liquor requires the addition of calcium hydroxide to form a soluble calcium copper cyanide complex in accordance with the equation:

$$2CaHCu(CN)_4 + 4CuCN + Ca(OH)_2$$
$$= 3CaCu_2(CN)_4 + 2H_2O$$

Step 4, the reactions which take place when the sulfuric acid is added to the liquor from Step 3 to precipitate cuprous sulfide along with the calcium sulfate are shown by the equations:

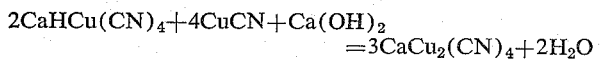
$$2CaCu_2(CN)_4 + 3H_2SO_4 + Ca(HS)_2$$
$$= 2Cu_2S + 3CaSO_4 + 8HCN$$
$$4CaHCu(CN)_4 + H_2SO_4 = 2Cu_2S + 5CaSO_4 + 16HCN$$
$$Ca(HS)_2 + H_2SO_4 = CaSO_4 + H_2S$$

The cuprous sulfide is separated from the calcium sulfate by froth flotation and a part of the cuprous sulfide thus separated is calcined to form the cuprous oxide used in Step 2 as hereinabove described. The remainder of the cuprous sulfide can be fed to a reverberatory furnace where it can be converted to pure copper.

Step 5, the filtrate from Step 4 consisting of a sulfuric acid solution of hydrogen cyanide is neutralized with calcium hydroxide to produce the alkaline cyanide leaching medium. The reactions which take place are shown by the equations:

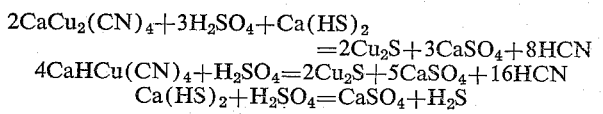
$$2HCN + Ca(OH)_2 = Ca(CN)_2 + 2H_2O$$
$$H_2SO_4 + Ca(OH)_2 = CaSO_4 + 2H_2O$$

Make-up HCN is added to this alkaline cyanide leaching medium to provide the necessary HCN concentration for reaction with the copper content of the ore in Step 1.

All of the above steps are carried out at ambient temperature and pressure conditions. Under these conditions and with the concentration used, there is no danger of creating a toxic hydrocyanic acid (HCN) concentration in the open air or in adequately ventilated enclosures where the reactions are carried out.

The amount of reagents used in the various steps or treatment is the stoichiometric amount required for the reactions which take place in each step or treatment. The amount required for a particular ore or other material can readily be determined by analysis of one or more samples of the low-grade copper sulfide ore treated and calculating the amount of reagents based on the results of the analysis. Per mol of recoverable copper in the ore, about 4 mols of HCN are employed (most of which is removed and reused), about 0.5 mol of $SO_2$, about 1.3 mols of $H_2SO_4$ and about 2 mols of calcium hydroxide.

The nature and objects of the invention can be more 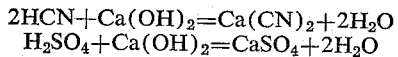

The accompanying drawing is a flow sheet showing the steps of a preferred embodiment of the invention in which the copper and cyanide values are recovered by treatment of the wash liquor with cuprous sulfite to precipitate cuprous cyanide and cuprous sulfide. The precipitated cuprous cyanide and cuprous sulfide are separated from the calcium sulfite simultaneously precipitated, by froth flotation and the precipitated cuprous cyanide and cuprous sulfide introduced into the leach liquor.

Instead of treating the wash liquor with cuprous sulfite, it can be treated with cuprous oxide and $SO_2$ so that the cuprous sulfite is formed in the wash liquor to react with the calcium copper complex to precipitate calcium sulfite, cuprous cyanide and cuprous sulfide. The calcium sulfite is separated from the cuprous cyanide and cuprous sulfide by froth flotation and the copper salts added to the leach liquor.

Still another procedure for recovering the copper and cyanide values from the wash liquor is to treat the wash liquor with cuprous sulfate and sulfur dioxide, thus effecting precipitation from the wash liquor of calcium sulfate along with cuprous cyanide and cuprous sulfide. These copper salts are separated from the calcium sulfate by froth flotation and the cuprous cyanide and cuprous sulfide introduced into the leach liquor.

The invention is not limited to the precipitation of the copper and cyanide values in the wash liquor by chemical precipitation but includes other procedures of effecting the transfer of the copper and cyanide values from the wash liquor to the leach liquor without excessively diluting the leach liquor.

I have found that the separation of the cuprous cyanide and cuprous sulfide from the calcium sulfite or calcium sulfate can be effected by froth flotation employing the usual flotation agents, such as pine oil and other such oil and alkyl xanthates, such for example as secondary butyl xanthate or sodium ethyl xanthate or potassium amyl xanthate. My discovery that cuprous cyanide is floatable and hence can be separated by froth flotation from calcium sulfite or calcium sulfate is indeed surprising in view of (a) the commonly accepted belief by those skilled in the flotation art that metal cyanides act as depressing agents in flotation techniques, and (b) alkali metal cyanides are commonly used as depressing agents when float separating copper sulfites in alkaline suspensions.

In the accompanying drawing the steps are identified by legends. These legends taken with the above description of the several steps render further description of the process unnecessary for a full and proper understanding of this invention.

The following example is given to illustrate a preferred embodiment of this invention. It will be understood that this invention is not limited to this example.

The low grade copper sulfide ore treated in this example is the tailings of an ore containing about 0.5% copper, the gangue of which is mainly calcite ($CaCO_3$), which tailings contain about 0.2% copper in fine particle size, widely disseminated in the gangue so that the residual 0.2% copper cannot be economically separated by froth flotation. Nor is acid leaching economical because of the large amount required to obtain reasonably satisfactory recovery of the copper.

63,500 grams of this ore containing 2.0 gram mols of copper are leached with 3240 grams of an alkaline cyanide leaching medium containing 6.0 gram mols of HCN, the amount required to recover 75% of the copper in the ore, as is feasible with the present invention. The leaching medium contains 1.875 gram mols of calcium hydroxide. The leach liquor contains 4 grams of copper per liter; the wet leached solids contain 13% moisture, thus containing 0.52 gram mol of copper as the copper complex ($CaHCu(CN)_4$).

The denuded solids are washed twice with water employing 8,260 cc. of water for each wash. The concentration of copper in the wash liquor is 1.6 grams per liter; the wash liquor contains 0.52 gram mol of copper complex (CaHCu(CN)$_4$).

The wash liquor is treated with 2 gram mols of sulfite for each gram mol of copper complex. In this example the wash liquor containing 0.52 gram mol of the copper complex is heated with 1.04 gram mols of cuprous sulfide (Cu$_2$SO$_3$) producing 2.08 gram mols of cuprous cyanide and 0.26 gram mol of cuprous sulfide.

The mixture of cuprous sulfide and cuprous cyanide is separated from the calcium sulfite by froth flotation employing pine oil and secondary butyl xanthate as the flotation agent. The cuprous cyanide-cuprous sulfide concentrate thus obtained is added to the leach liquor along with 0.416 gram mol of lime (Ca(OH)$_2$) and 0.067 gram mol of (Ca(HS)$_2$).

The calcium hydrosulfide (Ca(HS)$_2$) is added to insure substantially complete precipitation of the copper values in the subsequent precipitation step. There is thus obtained a composite leach liquor containing about 1.4 gram mols of copper complex, 0.208 gram mol of cuprous sulfide, and 0.245 gram mol of calcium hydrosulfide (Ca(HS)$_2$). The resultant solution is treated with 1.909 gram mols of sulfuric acid to precipitate cuprous sulfide and calcium sulfate and simultaneously produce a liquor saturated with calcium sulfate and containing chiefly hydrocyanic acid with some dissolved hydrogen sulfide.

The precipitate thus obtained contains 1.53 gram mols of cuprous sulfide and 2.050 gram mols of calcium sulfate. The cuprous sulfide is separated from the calcium sulfate by froth flotation employing pine oil and secondary butyl xanthate as the flotation agent. Of the cuprous sulfide thus recovered 0.832 gram mol can be calcined to produce cuprous oxide which is combined with sulfur dioxide to produce the 0.832 gram mol of cuprous sulfite required to precipitate the copper in the wash liquor. The remaining 0.698 gram mol of cuprous sulfide can be sent to a reverberatory furnace and treated in the conventional manner to produce pure copper. A copper of exceptionally high purity is thus obtained.

The filtrate from which the cuprous sulfide is separated is saturated with calcium sulfate and contains about 5.584 gram mols of HCN. This acid is neutralized with calcium hydroxide to produce the alkaline cyanide leaching medium. 2.792 gram mols of lime are used to neutralize the HCN.

Since certain changes can be made in carrying out the above disclosed process of recovering copper from low-grade copper sulfide ores without departing from the scope of this invention, it is intended that all matter contained in this description or in the accompanying drawing shall be interpreted as illustrative and not in a limiting sense.

What is claimed is:

1. The process of recovering copper from low-grade copper sulfide ore, which process comprises the following steps:

Step 1, leaching the ore with an alkaline cyanide leaching medium and separating the resultant leach liquor from the denuded solids;

Step 2, washing the denuded solids with water to recover copper and cyanide values thereon and separating the copper and cyanide values from the liquor;

Step 3, mixing the separated copper and cyanide values from the leach liquor from Step 1;

Step 4, treating the liquor from Step 3 with sulfuric acid to precipitate cuprous sulfide and separating the precipitated cuprous sulfide from the liquor; and Step 5, neutralizing the liquor from Step 4 with alkali and adding hydrogen cyanide to the neutralized liquor to form the alkaline cyanide leaching medium for use in Step 1.

2. The process of recovering copper from low-grade copper sulfide ore, which process comprises the following steps:

Step 1, leaching the ore with an alkaline cyanide leaching medium and separating the resultant leach liquor from the denuded solids;

Step 2, washing the denuded solids with water to recover copper and cyanide values thereon and precipitating the copper and cyanide values in the wash liquor by treating the wash liquor with a salt from the group consisting of the sulfites and sulfates of copper, said treatment being carried out in the presence of sulfur dioxide;

Step 3, separating the precipitated copper and cyanide salts from the precipitated salt of the group consisting of alkali metal and alkaline earth metal sulfites and dissolving the separated copper and cyanide salts in the leach liquor from Step 1;

Step 4, treating the liquor from Step 3 with sulfuric acid to precipitate cuprous sulfide and a sulfate from the group consisting of alkali metal and alkaline earth metal sulfates, separating the precipitated salts from the liquor, separating the cuprous sulfide from the sulfate salt and converting the cuprous sulfide to pure copper; and Step 5, neutralizing the liquor from Step 4 with alkali and adding hydrogen cyanide to the neutralized liquor to form the alkaline cyanide leaching medium for use in Step 1.

3. The process of recovering copper from low-grade copper sulfide ore, which process comprises the following steps:

Step 1, leaching the ore with a calcium cyanide leaching medium and separating the resultant leach liquor from the denuded solids;

Step 2, washing the denuded solids with water to recover copper and cyanide values thereon and precipitating the copper and cyanide values in the wash liquor by treating the wash liquor with cuprous sulfite;

Step 3, separating the precipitated copper and cyanide salts from the precipitated calcium sulfite and dissolving the separated copper and cyanide salts in the leach liquor from Step 1;

Step 4, treating the liquor from Step 3 with sulfuric acid to precipitate cuprous sulfide and calcium sulfate, separating the cuprous sulfide from the calcium sulfate and converting the cuprous sulfide to pure copper; and Step 5, neutralizing the liquor from Step 4 with calcium hydroxide and adding hydrogen cyanide to the neutralized liquor to form the calcium cyanide leaching medium for use in Step 1.

4. The process as defined in claim 3 in which the separation of the cuprous cyanide and cuprous sulfide from the calcium sulfite is effected by froth flotation to float the cuprous salts and thus effect their separation from the calcium sulfite.

5. The process of effecting separation of cuprous cyanide from an admixture thereof with calcium sulfite which comprises subjecting the mixture to froth flotation in the presence of a mixture of pine oil and alkyl xanthate flotation agent, thereby floating the cuprous cyanide while the calcium sulfite sinks and separating the floating cuprous cyanide from the calcium sulfite.

6. The process of separating a mixture of cuprous sulfide and calcium sulfate which comprises subjecting the mixture to froth flotation in the presence of a flotation agent, thus floating cuprous sulfide and causing the calcium sulfate to sink and separating the floating cuprous sulfide from the calcium sulfate.

7. The process of recovering copper from low-grade copper sulfide ores, which process comprises the following steps:

Step 1, leaching the ore with a leaching medium containing hydrogen cyanide and calcium hydroxide and separating the resultant leach liquor from the denuded solids;

Step 2, washing the denuded solids with water to recover copper and cyanide values thereon and treating the wash liquor with cuprous sulfite to precipitate cuprous cyanide, cuprous sulfide and calcium sulfite, separating the cuprous cyanide and cuprous sulfide from the calcium sulfite;

Step 3, mixing the separated cuprous cyanide and cuprous sulfide with the leach liquor and effecting the dissolution of the cuprous cyanide and cuprous sulfide in the leach liquor by adding thereto calcium hydroxide and calcium sulfhydrate;

Step 4, precipitating cuprous sulfide and calcium sulfate from the liquor of Step 3 by treatment of this liquor with sulfuric acid and separating the precipitated cuprous sulfide and calcium sulfate from the liquor; and Step 5, neutralizing the liquor from Step 4 with calcium hydroxide and adding hydrogen cyanide thereto to produce the alkaline cyanide leaching medium employed in Step 1.

8. The process of recovering copper from low-grade copper sulfide ores, which process comprises the following steps:

Step 1, leaching the ore with a leaching medium containing hydrogen cyanide and calcium hydroxide and separating the resultant leach liquor from the denuded solids;

Step 2, washing the denuded solids with water to recover copper and cyanide values thereon and treating the wash liquor with cuprous sulfite to precipitate cuprous cyanide, cuprous sulfide and calcium sulfite, separating the cuprous cyanide and cuprous sulfide from the calcium sulfite;

Step 3, mixing the separated cuprous cyanide and cuprous sulfide with the leach liquor and effecting the dissolution of the cuprous cyanide and cuprous sulfide in the leach liquor by adding thereto calcium hydroxide and calcium sulfhydrate;

Step 4, precipitating cuprous sulfide and calcium sulfate from the liquor from Step 3 by treatment of this liquor with sulfuric acid and separating the precipitated cuprous sulfide and calcium sulfate from the liquor;

Step 5, neutralizing the liquor from Step 4 with calcium hydroxide and adding hydrogen cyanide thereto to produce the alkaline cyanide leaching medium employed in Step 1; and Step 6, separating the cuprous sulfide from the calcium sulfate of Step 4, calcining a portion of the cuprous sulfide thus separated to produce cuprous oxide, employing the cuprous oxide to react with sulfur dioxide to form the cuprous sulfite employed in Step 2, and converting the remainder of the cuprous sulfide to pure copper.

9. The process of recovering copper from low-grade copper sulfide ores, which process comprises the following steps:

Step 1, leaching the ore with a leaching medium containing hydrogen cyanide and calcium hydroxide and separating the resultant leach liquor from the denuded solids;

Step 2, washing the denuded solids with water to recover copper and cyanide values thereon and treating the wash liquor with cuprous sulfate and sulfur dioxide to precipitate cuprous cyanide, cuprous sulfide and calcium sulfate, and separating the cuprous cyanide and cuprous sulfide from the calcium sulfate;

Step 3, mixing the separated cuprous cyanide and cuprous sulfide with the leach liquor and effecting the dissolution of the cuprous cyanide and cuprous sulfide in the leach liquor by adding thereto calcium hydroxide and calcium sulfhydrate;

Step 4, precipitating cuprous sulfide and calcium sulfate from the liquor of Step 3 by treatment of this liquor with sulfuric acid and separating the precipitated cuprous sulfide and calcium sulfate from the liquor; and Step 5, neutralizing the liquor from Step 4 with calcium hydroxide and adding hydrogen cyanide thereto to produce the alkaline cyanide leaching medium employed in Step 1.

References Cited by the Examiner

UNITED STATES PATENTS

| | | | |
|---|---|---|---|
| 1,387,289 | 8/1921 | Mills et al. | 75—105 |
| 1,503,229 | 7/1924 | Clark | 75—108 |
| 1,648,761 | 11/1927 | Dietzsch | 75—105 |
| 2,390,540 | 12/1945 | Keller | 75—108 |

DAVID L. RECK, *Primary Examiner.*

N. F. MARKVA, *Assistant Examiner.*